United States Patent
Idera et al.

(10) Patent No.: US 11,666,948 B2
(45) Date of Patent: Jun. 6, 2023

(54) PROJECTION INSTRUCTION DEVICE, PARCEL SORTING SYSTEM, AND PROJECTION INSTRUCTION METHOD

(71) Applicant: PANASONIC INTELLECTUAL PROPERTY MANAGEMENT CO., LTD., Osaka (JP)

(72) Inventors: Takaaki Idera, Kanagawa (JP); Takaaki Moriyama, Kanagawa (JP); Shohji Ohtsubo, Kanagawa (JP); Pongsak Lasang, Singapore (SG); Takrit Tanasnitikul, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/624,230

(22) PCT Filed: May 16, 2018

(86) PCT No.: PCT/JP2018/018944
§ 371 (c)(1),
(2) Date: Dec. 18, 2019

(87) PCT Pub. No.: WO2019/003687
PCT Pub. Date: Jan. 3, 2019

(65) Prior Publication Data
US 2020/0234453 A1    Jul. 23, 2020

(30) Foreign Application Priority Data
Jun. 30, 2017 (JP) .............................. JP2017-129575

(51) Int. Cl.
*G06T 7/246* (2017.01)
*B07C 3/14* (2006.01)
(Continued)

(52) U.S. Cl.
CPC ................ *B07C 7/005* (2013.01); *B07C 3/14* (2013.01); *G06F 18/22* (2023.01); *G06T 7/246* (2017.01);
(Continued)

(58) Field of Classification Search
CPC ......... G06T 7/246; G06T 7/223; G06T 7/248; G06T 7/251; G06T 2207/10024;
(Continued)

(56) References Cited

U.S. PATENT DOCUMENTS

| 7,090,134 B2 | 8/2006 | Ramsager |
| 2010/0073502 A1* | 3/2010 | An ........................... G06T 7/248 |
| | | 348/222.1 |

(Continued)

FOREIGN PATENT DOCUMENTS

| EP | 1148316 A1 * | 10/2001 | ........... G01B 11/024 |
| JP | 61-069601 | 4/1986 | |
| WO | 2015/145982 | 10/2015 | |

OTHER PUBLICATIONS

Official Communication issued in International Patent Application No. PCT/JP2018/018944, dated Jul. 10, 2018, along with English translation.

*Primary Examiner* — Sean M Conner
*Assistant Examiner* — Stephen M Brinich
(74) *Attorney, Agent, or Firm* — Greenblum & Bernstein, P.L.C.

(57) ABSTRACT

There is provided a projection instruction device that generates a projection image to be projected on parcel based on sensing information of the parcel, the device including: a
(Continued)

processor; and a memory, in which by cooperating with the memory, the processor performs weighting on a value of a feature amount of a color image of parcel included in the sensing information based on a distance image of parcel included in the sensing information, and tracks the parcel based on the weighted value of the feature amount of the color image.

9 Claims, 6 Drawing Sheets

(51) Int. Cl.
    *G06K 9/62*     (2022.01)
    *B07C 7/00*     (2006.01)
    *G06F 18/22*     (2023.01)
    *B07C 3/08*     (2006.01)

(52) U.S. Cl.
    CPC ...... *B07C 3/08* (2013.01); *G06T 2207/10024* (2013.01)

(58) Field of Classification Search
    CPC .............. G06T 2207/10; G06K 9/6215; G06K 9/6214; G06K 9/6212; B07C 3/14; B07C 3/10; B07C 3/18; G01N 2021/8854; G01N 2021/8858; G01N 2021/8861; G01N 2021/8864
    USPC ........ 382/100–104, 190–192, 195, 201, 206, 382/321
    See application file for complete search history.

(56) References Cited

U.S. PATENT DOCUMENTS

| | | | |
|---|---|---|---|
| 2012/0301032 A1* | 11/2012 | Kawanishi | G06F 16/583 382/190 |
| 2014/0022394 A1* | 1/2014 | Bae | G06K 9/00624 348/169 |
| 2015/0015704 A1* | 1/2015 | Hirasawa | G06T 7/292 348/143 |
| 2015/0036876 A1* | 2/2015 | Marrion | G06K 9/2054 382/103 |
| 2015/0306634 A1* | 10/2015 | Maeda | G06K 9/3233 382/101 |
| 2017/0066597 A1 | 3/2017 | Hiroi | |

* cited by examiner

PROJECTION INSTRUCTION DEVICE, PARCEL SORTING SYSTEM, AND PROJECTION INSTRUCTION METHOD

TECHNICAL FIELD

The present disclosure is related to a projection instruction device, a parcel sorting system, and a projection instruction method useful to sort parcel.

BACKGROUND ART

As recent economic activity rises, the amount of parcel circulation tends to increase. In a circulation process of parcels, sorting work for sorting the parcel by destination is a time-consuming process and relies on manual work from before, but a technology of automating at least a part of the sorting work is proposed.

PTL 1 discloses a system in which moving parcel is tracked, an image to be displayed is determined based on information related to the parcel read from the parcel and information of a position of the parcel, and the image is projected from a projector to display the image on the parcel.

CITATION LIST

Patent Literature

PTL 1: U.S. Pat. No. 7,090,134

SUMMARY OF THE INVENTION

Technical Problem

However, in recent years, the amount of parcel circulation has been increased more and more and types of parcel have also become various, so that a technology of effectively and precisely sorting the parcel is required.

The present disclosure is related to the technology of effectively and precisely sorting the parcel.

Solutions to Problem

According to the present disclosure, there is provided a projection instruction device that generates a projection image to be projected on parcel based on sensing information of the parcel, the device including: a processor; and a memory, in which by cooperating with the memory, the processor performs weighting on a value of a feature amount of a color image of parcel included in the sensing information based on a distance image of parcel included in the sensing information, and tracks the parcel based on the weighted value of the feature amount of the color image.

According to the present disclosure, there is provided a parcel sorting system including: the projection instruction device described above; a label reader that reads parcel identification information from a label attached to parcel; an image sensor that obtains the distance image and the color image; and an image projection device that projects the projection image on the parcel.

According to the present disclosure, there is provided a projection instruction method of generating a projection image to be projected on parcel based on sensing information of the parcel, the method including: by causing a processor to cooperate with a memory, performing weighting on a value of a feature amount of a color image of parcel included in the sensing information based on a distance image of parcel included in the sensing information; and tracking the parcel based on the weighted value of the feature amount of the color image.

According to the present disclosure, it is possible to more effectively and precisely sort parcel and to further deal with an increase in the amount of parcel circulation. Specifically, it is possible to prevent tracking accuracy of parcels from deteriorating even when parcels are adjacent or overlapped with each other.

DESCRIPTION OF EMBODIMENTS

Hereinafter, embodiments (hereinafter, referred to as "present embodiment") which specifically disclose a projection instruction device, a parcel sorting system, and a projection instruction method according to the present disclosure will be described in detail with reference to appropriate drawings. However, in some cases, an unnecessarily detailed explanation may be omitted. For example, in some cases, a detailed explanation of already well-known items and a repetition explanation of substantially the same configuration may be omitted. This is to avoid unnecessary repetition of the following description and to facilitate understanding by those skilled in the art. The accompanying drawings and the following description are provided to enable those skilled in the art to fully understand the present disclosure and are not intended to limit a scope of the claims.

Hereinafter, the embodiments of the disclosure will be described with reference to FIGS. 1 to 6.

Configuration

Figure 1:
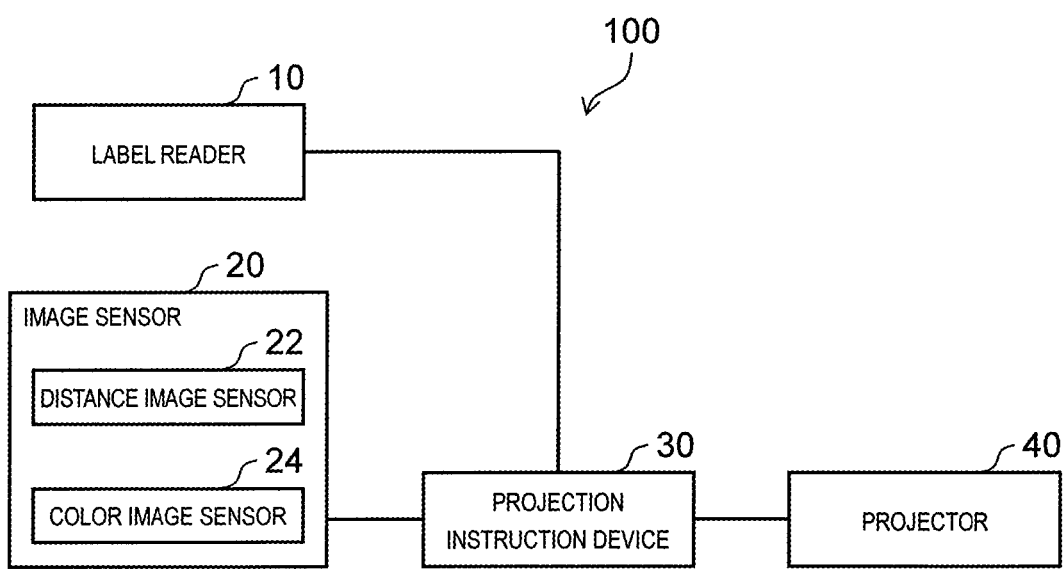
FIG. 1 is a block diagram illustrating a configuration of a parcel sorting system according to an embodiment.

FIG. 1 is a block diagram illustrating a configuration of the parcel sorting system according to the embodiment. Parcel sorting system 100 illustrated in FIG. 1 is installed in, for example, a distribution center. Parcel sorting system 100 includes label reader 10, image sensor 20, projection instruction device 30, and projector 40. Parcel sorting system 100 is a system which supports work of a worker who sorts parcel transported by a transport conveyor. Parcel sorting system 100 is installed at the distribution center owned by, for example, a retailer, a wholesaler, an internet distributor, or the like. Parcel to be sorted generally has an approximately rectangular parallelepiped shape, but the outward shape of the parcel is not particularly limited, and a type of the parcel is also not particularly limited. The configuration of the parcel sorting system is not limited to the configuration illustrated in FIG. 1. For example, one label reader 10 may be connected with a plurality of image sensors 20, a plurality of projection instruction devices 30, and a plurality of projectors 40. The number of each component can be appropriately modified according to the purpose.

Label reader 10 as a reading device is a device which includes various components such as a lens (not illustrated), an image sensor, and the like. By using label reader 10, it is possible to read label recording information including various types of information related to the parcel from a label attached to the parcel transported by the transport conveyor. By using the read label recording information, it becomes possible to specify the parcel. By the read information, parcel identification information is defined.

Image sensor 20 is an imaging device which includes various components such as a lens (not illustrated), an image sensor, and the like. Image sensor 20 is generally configured by an imaging camera. The imaging camera is a three-dimensional camera, a plurality of two-dimensional cameras, or the like. Image sensor 20 includes distance image sensor 22 and color image sensor 24.

Distance image sensor 22 images the parcel transported by the transport conveyor and generates a distance image. The generated distance image is used as information indicating a position of the parcel, a distance to the parcel, a size of the parcel, and the like. "Distance image" means an image including distance information indicating a distance from an imaging position to a position (including a surface of parcel) indicated by each of pixels (that is, "image" in the present disclosure includes a distance image). In addition, a term of "distance image" includes one which cannot be recognized as an image by human eyes, such as a table or the like listing numerical values indicating a distance. That is, "distance image" may be information indicating a relationship between coordinates and a distance in the imaged region, and a data structure is not limited thereto. In the present disclosure, distance image sensor 22 is used for specifying the position of the parcel. Therefore, distance image sensor 22 also can be replaced with another sensing device (an ultrasonic sensor, an infrared sensor, a stereo camera, and a monocular video camera).

Color image sensor 24 images parcel generated by the distance image and generates a color image. "Color image" refers to an image in which a color of a surface of parcel is expressed with a predetermined gradation, and the "gradation" includes not only 256 gradations of RGB but also all kinds of grayscales or the like. Color image sensor 24 in the present disclosure is used for tracking each parcel, for the parcel specified by distance image sensor 22. Color image sensor 24 also can be replaced with another sensing device (an ultrasonic sensor, an infrared sensor, a stereo camera, and a monocular video camera).

That is, in the present disclosure, a term of "image" includes both of a distance image and a color image. In the present disclosure, information output from an image sensor as a sensing device including a distance image sensor and a color image sensor is referred to as sensing information. In the present embodiment, an example of the sensing device will be described by using image sensor 20 (including distance image sensor 22 and color image sensor 24). In addition, in the present embodiment, an example of the sensing information will be described by using a distance image output by distance image sensor 22 and a color image output by color image sensor 24.

Figure 2:
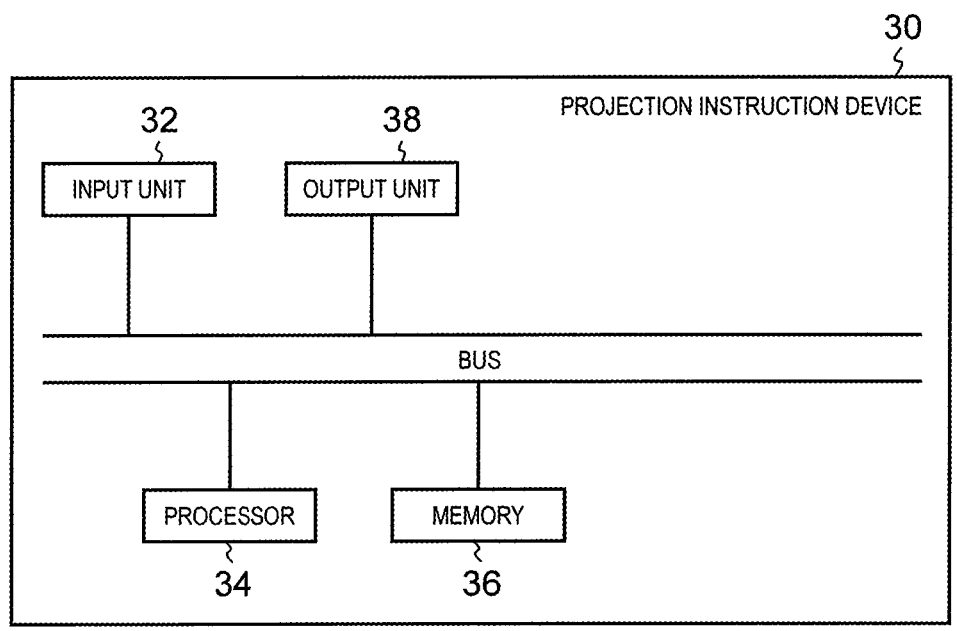
FIG. 2 is a block diagram illustrating a configuration of a projection instruction device according to the embodiment.

Projection instruction device 30 functions as a calculation device in parcel sorting system 100. As illustrated in FIG. 2, projection instruction device 30 includes input unit 32, processor 34, memory 36, and output unit 38 connected with one another via a bus. Input unit 32 receives parcel identification information for specifying parcel obtained from the label recording information read by label reader 10, a distance image generated by distance image sensor 22, and a color image generated by color image sensor 24. Processor 34 is configured by a general calculation device and generates a projection image to be projected on parcel based on the parcel identification information, the distance image, and the color image. Memory 36 as a storage device reads a control program necessary for various processes by processor 34 and performs an operation such as data backup. That is, processor 34 and memory 36 control various processes by projection instruction device 30 by cooperating with each other. Output unit 38 outputs the projection image generated by processor 34 to projector 40. In the present disclosure, "processor" does not mean only a single processor. "Processor" means an operator having a plurality of processors having an identical purpose, or a plurality of processors having different purposes in a case where they perform processes in collaboration with one another (for example, general-purpose central processing unit (CPU) and a graphic processing unit (GPU)).

Projector 40 is configured by a general projection device, and projects projection light including the projection image received from projection instruction device 30, on the parcel and displays the projection image onto the parcel.

Parcel sorting system 100 can be configured to include label reader 10, image sensor 20 (distance image sensor 22 and color image sensor 24), projection instruction device 30, and projector 40 connected with one another in wired communication or in wireless communication. In addition, parcel sorting system 100 also can be configured to include two or more devices of any of label reader 10, image sensor 20, projection instruction device 30, and projector 40 as an integral device. For example, image sensor 20 and projector 40 can be combined to construct an integral imaging projection device (see FIG. 3A).

Outline of System

Figure 3A:
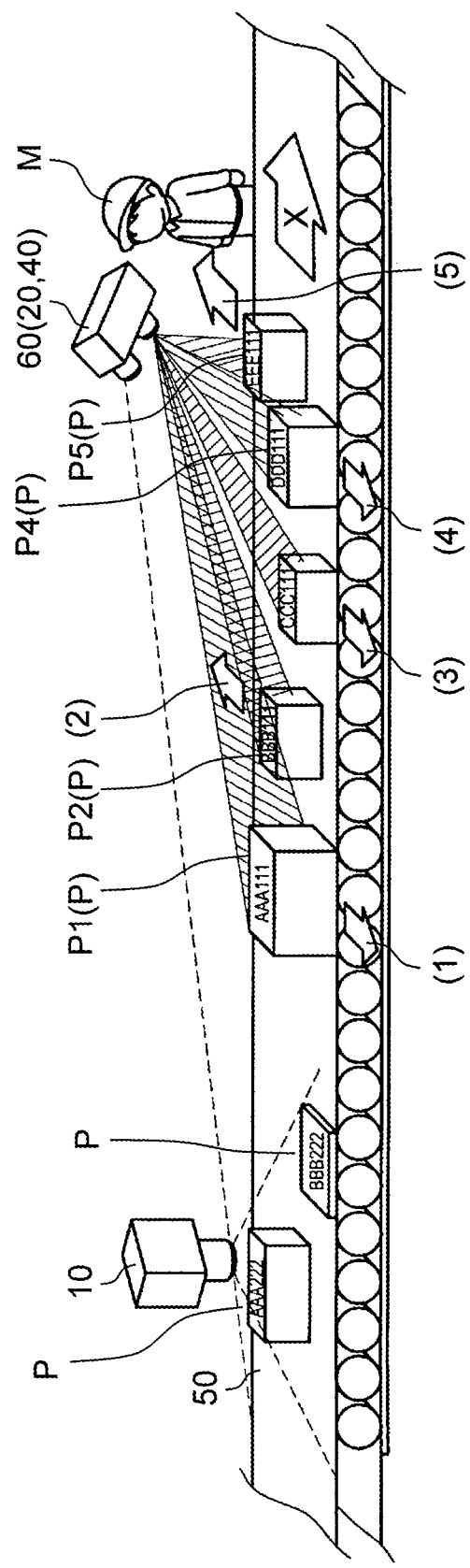
FIG. 3A is a conceptual diagram illustrating a status in which the parcel sorting system is installed in a distribution center and is in operation.

FIG. 3A is a conceptual diagram illustrating a status in which parcel sorting system 100 is installed in the distribution center and is in operation. In the related art, each of workers M visually checks the label attached to each parcel P transported by transport conveyor 50 in the arrow X-direction. When the parcel to be delivered by the worker himself arrives, worker M needs to pick up the parcel and place the parcel once in the vicinity such as the worker's own feet, a basket, a truck bed. However, in a case of visually sorting by the worker, there is a limit in work efficiency of the worker, so that it is necessary to limit a transport speed to a predetermined value or less. As a result, a limit value of the amount of parcel which the worker can sort in a unit time, was few. In addition, due to an erroneous recognition when the worker visually checks the label, there is a possibility that an error may occur at the time of sorting. In recent years, the amount of parcel circulation has increased, and these problems receive more attention.

In the present embodiment, as illustrated in FIG. 3A, label reader 10 disposed above transport conveyor 50 reads the label attached to each parcel P transported by transport conveyor 50. In the label, the label recording information including various information related to the parcel is described. The label recording information includes information similar to a parcel identification number individually assigned to the parcel, a name, an address, and a telephone number of a sender, a name, an address, and a telephone number of a receiver, a parcel type, and the like. The label may be read by the worker in charge by manually placing a barcode reader as label reader 10 to a barcode in the label.

Further, image sensor 20 images the image (the distance image and the color image) of parcel P transported by transport conveyor 50 and obtains information such as a position of parcel P, a distance to parcel P, a size (lengths of three sides when parcel P is rectangular parallelepiped) of parcel P, a color of parcel P, a pattern of parcel P, and the like. Further, positions of label reader 10 and image sensor 20, a type of the sensing device, and an order of processes are not particularly limited to the illustrated embodiments. As described above, in the present example, image sensor 20 and projector 40 are configured as an integrated imaging projection device 60 and are disposed above transport conveyor 50.

Projection instruction device 30 (not illustrated in FIGS. 3A and 3B) is configured by a computer disposed in, for example, the vicinity of transport conveyor 50 or another room and generates the projection image to be displayed on parcel P (for example, upper surface when parcel P is rectangular parallelepiped) based on the information, obtained by label reader 10, specifying the parcel and the distance image and the color image generated by image sensor 20. Projection instruction device 30 transmits a projection instruction to project the projection image on parcel P, to projector 40.

Figure 3B:
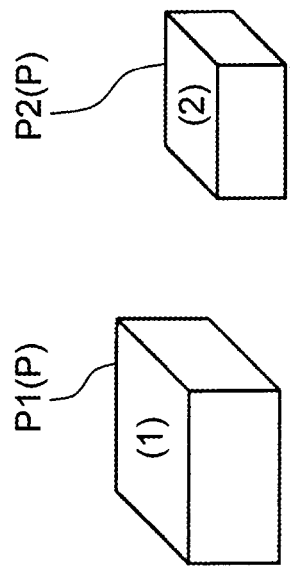
FIG. 3B is a diagram illustrating a state in which a projection image including a number is projected on an upper surface of parcel.
Figure 4:
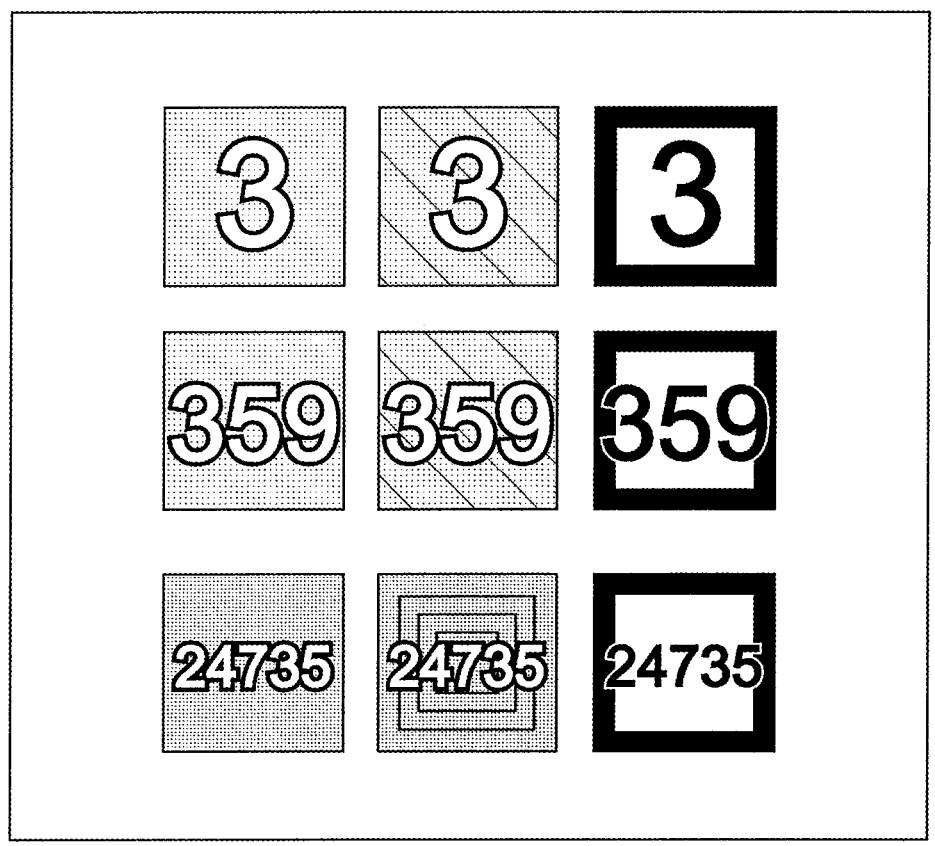
FIG. 4 is a diagram illustrating an example of a projection image generated by the projection instruction device according to the embodiment.

Projector 40 which receives the projection instruction, as an image projection device, projects projection light including the projection image generated by projection instruction device 30 on parcel P and displays the projection image on parcel P. Here, the projection image displayed on parcel P is, for example, an image of an encircled number having a color indicating a sorting location corresponding to a delivery address of parcel P (see FIG. 3B). Here, the encircled number corresponds to, for example, a number of a truck carrying sorted parcel P (a number of the truck itself, a parking lot number, or the like), a number of a shelf or a box to be carried into the truck, or the like. Further, instead of directly corresponding to the number such as the shelf or the box, the encircled number may correspond to a number of a shooter which moves the picked-up parcel to another location or a truck. Since a parking position of the truck or the like frequently changes according to a traffic condition or the like, it may be difficult to correspond to the sorting destination viewed from the periphery of transport conveyor 50 at any time. Therefore, the shooter is sandwiched between transport conveyor 50 and the transport truck, and a number of the shooter is projected on the periphery of transport conveyor 50, so that even if a configuration on the periphery of transport conveyor 50 is not changed as needed, it is possible to deal with the change of the sorting destination by disposing an opening of the shooter. Certainly, according to a status, various types of projection images are displayed. Another example of displaying the number may be a zip code corresponding to the delivery address, a number of a worker who picks up parcel P, or the like. In addition, as an example of displaying information other than the number, an arrow indicating the sorting direction (such as right or left in a transport direction of transport conveyor 50) or characters (such as "left" and "right") may be used. Further, a display form is not limited to the encircled number, and various types such as numbers surrounded by squares ("3", "359", and "24735") as illustrated in FIG. 4 are conceivable. Furthermore, the projection image is not limited to numbers or characters enclosed with a frame, but may be white numbers or characters with a solid background. In addition, the shape of the number or character to be displayed such as a circle, a triangle, a square, or the like may be switched according to information to be displayed. Further, a picture capable of being individually associated with each information to be displayed may be displayed. The projection image is not limited to a still image, and may be an animation. As an example of the animation, the example described above may be blinked, enlarged or reduced, and a color may be changed. An animation reflecting the sorting direction may be projected. An example of the animations reflecting the sorting direction may include various patterns, for example, a moving light ray or light spot in the sorting direction, forming all or a part of the projection image in the sorting direction, changing the color of the projection image in the sorting direction, and displaying an arrow moving in the sorting direction, and the like. In a case where only a part of the projection image is a target of the animation, a part having a large influence on determination of the sorting destination by a worker, such as a number, an arrow, or the like, may be not changed, and a part not affected by the sorting destination such as a frame line may be changed. Meanwhile, in a situation in which it is more efficient to convey the sorting direction more intuitively than the meaning of the number or the like projected within the frame line, such as a case where there are few options for the sorting destination, a number, an arrow, or the like may be moved in the sorting direction within a fixed frame. The animation may be repeatedly projected or may be projected only once. In the present disclosure, "image projection device" is not limited to a device which directly projects a light beam on the parcel. In the present disclosure, "image projection device" includes glasses which can display the image. That is, in the present disclosure, in a case of expressing as projecting projection light on the parcel, displaying the image on the parcel, projecting the image on the parcel, or the like, the expression also includes allowing the worker to recognize the image via the glasses capable of displaying the image in a pseudo manner as if the projection light is projected on the parcel. That is, in a case where the worker wears special glasses capable of displaying the image, the projection image of parcel P may be superimposed on the image of parcel P viewed via the glasses.

In FIG. 3A, worker M (omitted for other workers) in charge of picking up the parcel stands beside transport conveyor 50 and the parcel arriving each region is picked up from transport conveyor 50 as indicated by encircled number 1, encircled number 2, encircled number 3, or the like.

For example, parcel P1 has parcel identification information of "AAA111" on a label, and the parcel identification information of "AAA111" specifies that the parcel is a target to be sorted in region A. Here, when parcel P1 reaches the specific region, processor 34 transmits the generated projection image to projector 40 as illustrated in FIG. 3B. Projector 40 projects the projection image on parcel P1. The worker in the region can easily pay attention to parcel P1, to be picked up by the worker, which reaches the specific region of the worker, accordingly, the parcel can be sorted more efficiently and precisely.

In the present embodiment, as illustrated in FIG. 3A, whether or not one projector 40 projects the image on a plurality of specific regions may be switched and whether or not a plurality of projectors 40 project the image on each of the specific regions may be switched.

Hereinafter, in parcel sorting system 100 according to the embodiment, an outline of an operation of sorting the parcel performed by projection instruction device 30 will be described.

Outline of Operation

Figure 5:
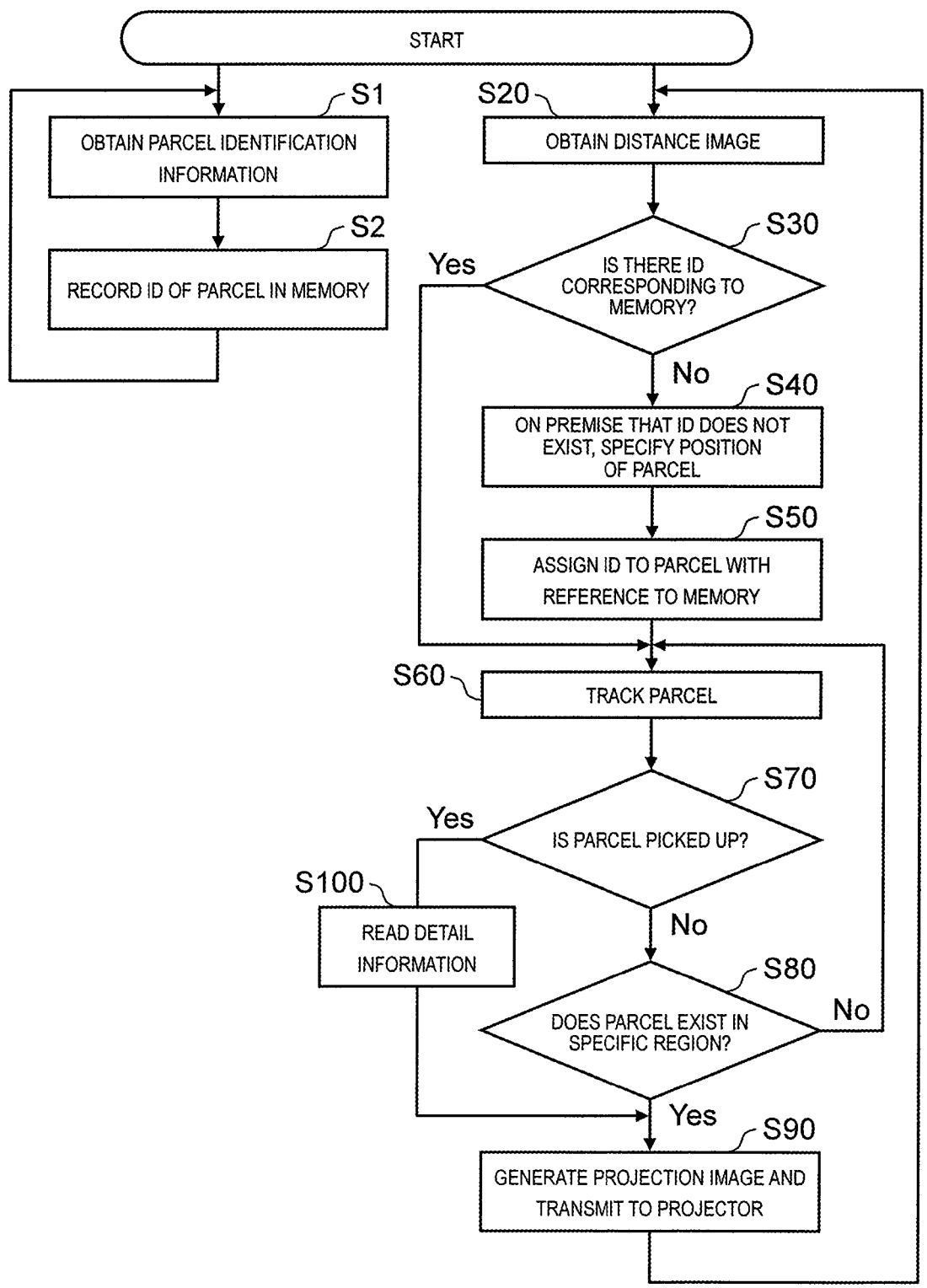
FIG. 5 is a flowchart illustrating an outline procedure of an operation mainly performed by the projection instruction device.

FIG. 5 is a flowchart illustrating an outline procedure of an operation of mainly performed by projection instruction device 30 of the present embodiment, particularly processor 34 of projection instruction device 30. First, after label reader 10 reads the label recording information of the label of the parcel, input unit 32 of projection instruction device 30 obtains the parcel identification information corresponding to the label recording information from label reader 10 (step S1). The parcel identification information is information including at least one piece of information similar to the parcel identification number individually assigned to the parcel, the name, the address, and the telephone number of the sender, the name, the address, and the telephone number of the receiver, the parcel type, and the like. For the parcel identification information, processor 34 assigns an ID as a parcel identification number specifying the parcel and records the ID and time information corresponding to a time at which the ID is assigned, in memory 36 (step S2). The ID recorded in memory 36 may be the parcel identification number originally recorded in the parcel identification information or may be assigned by projection instruction device 30 generating a new ID.

On the other hand, in parallel with step S1 and step S2, after distance image sensor 22 of image sensor 20 images the distance image of the parcel, input unit 32 of projection instruction device 30 obtains the distance image as the sensing information from distance image sensor 22 (step S20). Processor 34 determines whether or not the ID corresponding to the parcel existing in the distance image exists in memory 36.

An example of a method of determining whether or not the ID corresponding to the parcel existing in the distance image exists in memory 36 is as follows. That is, processor 34 calculates a time required for the parcel to move between label reader 10 and distance image sensor 22 by a distance (assumed to be known) between label reader 10 and distance image sensor 22 and a speed of transport conveyor 50. By subtracting the time from a time when the distance image is obtained, a time when the ID is assigned to the parcel existing in the distance image by label reader 10 (or processor 34) can be estimated. It can be estimated that the ID assigned close to the estimated time is the ID corresponding to the parcel existing in the distance image. In addition, as another example, a method of installing another distance image sensor in the vicinity of label reader 10 may be possible. That is, by tracking the parcel, to which the ID is assigned, by using another distance image sensor installed in the vicinity of label reader 10 since label reader 10 assigns the ID (or processor 34), a distance between the parcel (or the ID) and label reader 10 is measured for a time unit. Processor 34 can estimate the ID of the parcel in the distance image obtained in predetermined step S20 by the measured distance between the parcel (or the ID) and label reader 10, a distance of the parcel in the distance image obtained in step S20, and a distance (assumed to be known) between two distance image sensors.

In this way, processor 34 determines whether or not the ID corresponding to the parcel included in the distance image exists in memory 36 (step S30). That is, as described in step S2, in memory 36, the parcel identification information, the ID, and the time information corresponding to a time when the ID is assigned are recorded in advance. On the other hand, as described above, for example, when processor 34 subtracts the time required for the parcel to move between label reader 10 and distance image sensor 22 from the time when the distance image is obtained, a time when the ID is assigned to the parcel existing in the distance image by label reader 10 (or processor 34) can be estimated. Processor 34 compares the time information recorded in memory 36 in advance and the estimated time. In a case where the time information is close to the estimated time (for example, a case where a time difference is equal to or smaller than a predetermined time), processor 34 can determine that the ID corresponding to the parcel included in the distance image exists in memory 36. In a case where it is determined that the ID corresponding to the parcel exists in memory 36 (Yes in step S30), the process moves to step S60 and subsequent steps.

In a case where it is determined that the ID corresponding to the parcel does not exist in memory 36 (No in step S30), on the premise that the ID is not assigned to the parcel, processor 34 specifies the position of the parcel again (step S40) and assigns the ID to the parcel (step S50).

In parallel with the above steps, color image sensor 24 generates a color image for each parcel of which a distance image is obtained. Processor 34 tracks the parcel, to which the ID is attached, transported and moved by transport conveyor 50 based on the color image from color image sensor 24 obtained by input unit 32 (step S60). Based on the color image likewise, processor 34 determines whether or not the worker picks up the tracked parcel (step S70). In a case where it is determined that the parcel is not picked up by the worker (No in step S70), processor 34 determines whether or not the parcel exists in a specific region (a predetermined region in which parcel is to be picked up) described below. In a case where it is determined that the parcel exists (reaches) in the specific region (Yes in step S80), processor 34 generates the projection image and transmits the projection image to projector 40 (step S90). In a case where it is not determined that the parcel exists (reaches) in the specific region (No in step S80), the process returns to step S60 and processor 34 continues to track the parcel.

In addition, in step S70, in a case where it is determined that the parcel is picked up by the worker (Yes in step S70), processor 34 reads detail information of the parcel from memory 36 (step S100), generates the projection image including the detail information, and outputs the projection image generated by output unit 38, to projector 40 (step S90). Projector 40 which obtains the projection image from projection instruction device 30, projects the projection image on the corresponding parcel.

The above is the outline of the operation procedure performed by processor 34 and the like of projection instruction device 30. Of course, the operation procedure is not limited to that described above. For example, the determination in step S70 can be omitted. In addition, for the determination in step S70, it is possible to use contact determination between a hand of the worker and the parcel, a color image, a distance image, or the like. Next, a specific case of the present disclosure will be described.

Generation of Weighting Information

When tracking parcel, it is required to determine whether or not the parcel is the same as recognized parcel. Since a shape and a size of the being transported varies, projection instruction device 30 according to the present disclosure uses a determination area having a predetermined scope. The determination area is associated with color information extracted from a color image of parcel at the previous time. In the present disclosure, based on a feature amount such as a similarity between a pixel of a color image corresponding to the determination area and a color image of parcel or the like, an identity of parcels is evaluated. For example, in a case of using a color similarity as the feature amount, by comparing and scanning a region of a color image corresponding to an upper surface of each parcel with a color associated with a determination area, if a region having a color having a high degree of similarity with the color associated with the determination area is found, it is determined that the parcels are the same. Since the surrounding environment changes little by little as the parcel moves, the color image changes even for the same parcel. Therefore, in a case where a region with a high degree of similarity is found, the color associated with the determination area is also updated to a color of the region.

Generally, in parcel sorting system 100 illustrated in FIG. 3A, a plurality of parcels are sequentially transported by transport conveyor 50. In a case where the parcels are separated from each other, projection instruction device 30 easily controls a determination area so as to track the parcel, and it is expected that erroneous recognition and tracking for the parcel little occur.

Figure 6A:
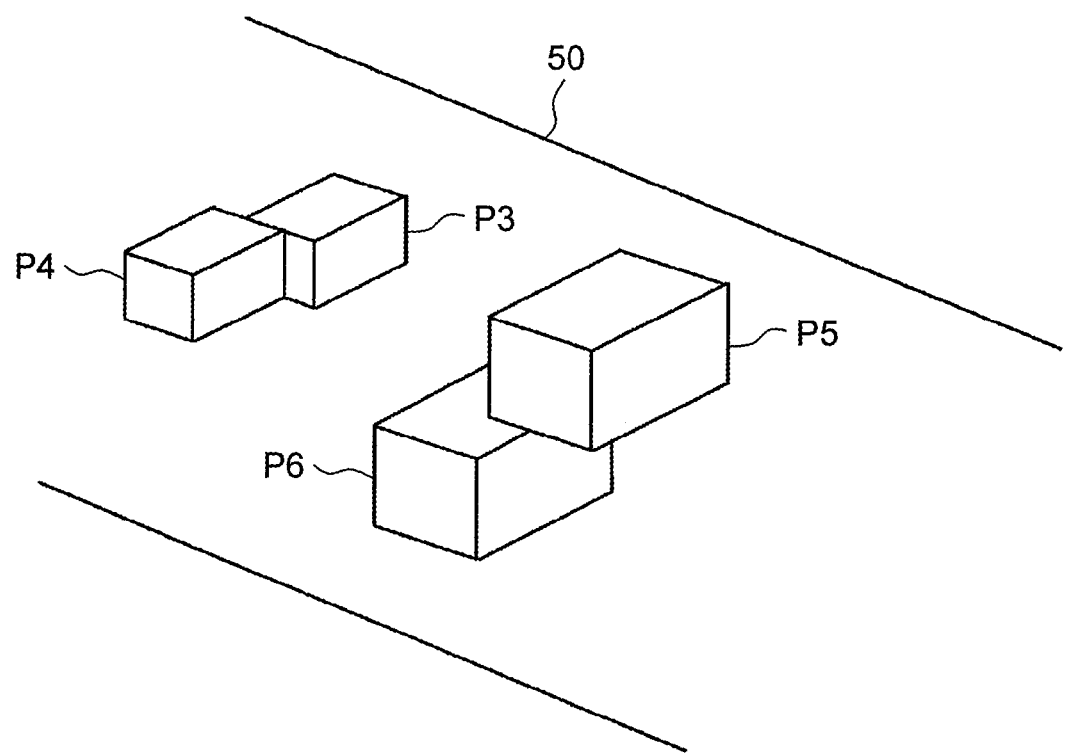
FIG. 6A is a conceptual diagram illustrating a state in which parcels are adjacent or overlapped with each other.

Meanwhile, as illustrated in FIG. 6A, a situation in which plurality of parcels P3 and P4 are transported adjacent to each other may occur. In this case, a situation in which image sensor 20 erroneously recognizes parcels P3 and P4 as one parcel may occur. In this case, when a color of parcel P3 and a color of parcel P4 are similar to each other, a determination area is moved to a region having a color similar to a color of a region with which the determination area is associated, in a color image of the one parcel which is a result obtained by erroneously recognizing parcels P3 and P4. That is, the determination area originally provided for tracking parcel P3 is not necessarily associated with parcel P3, and may be associated with the color of parcel P4 or a color of a region over parcels P3 and P4. When parcels P3 and P4 are separated from each other in this state, there is a possibility that the determination area originally set for parcel P3 will be taken over by parcel P4. As a result, since there is no determination area for tracking parcel P3 and parcel P4 is erroneously recognized as parcel P3, parcels P3 and P4 are not tracked correctly. The same problem is not limited to the case where parcels P3 and P4 are completely adjacent to each other, and may occur in a case where a distance between pieces of P3 and P4 is close and cannot be separated by accuracy of a distance image sensor.

In addition, as illustrated in FIG. 6A, a situation in which when worker M lifts parcel P5, parcel P5 and parcel P6 are imaged to be overlapped with each other and image sensor 20 erroneously recognizes parcels P5 and P6 as one parcel may occur. Even in this case, as a result of a determination area set for parcel P6 being taken over for parcel P5, parcel P6 may be missed, or on the other hand, as a result of a determination area set for parcel P5 being taken over for parcel P6, parcel P5 may be missed.

Therefore, in the present disclosure, a value used for determination is weighted so that the determination area is not easily moved to another parcel.

Figure 6B:
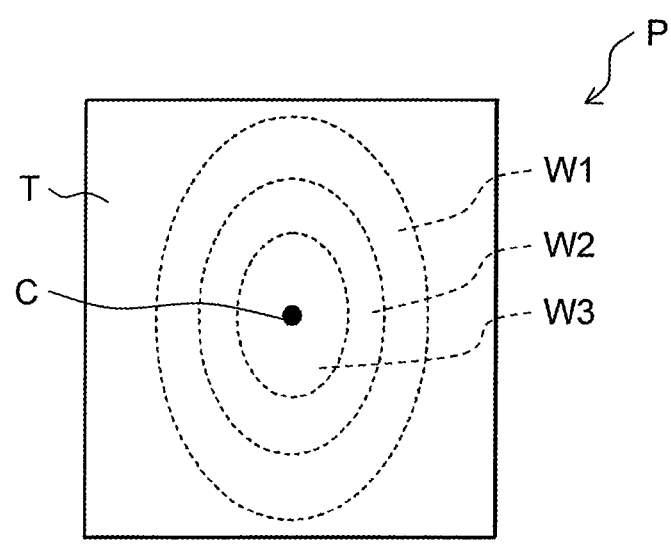
FIG. 6B is a conceptual diagram illustrating weighting information on an upper surface of parcel.

FIG. 6B is a conceptual diagram illustrating weighting information on an upper surface of parcel P. By cooperating with memory 36, processor 34 specifies parcel P based on a distance image of parcel P included in sensing information and tracks the parcel based on a color image of parcel P included in the sensing information. Further, in order to suppress the erroneous recognition, process 34 specifies a center position obtained in a case where a distance image is projected onto a plane, and generates weighting information such that the closer to the center position on the plane, the greater the weight applied to a feature value of the color image.

That is, since an edge portion of parcel overlaps with other parcel and changes greatly depending on a situation, a location, and a time in a region outside the parcel, it is conceivable that color information of the edge portion is likely to cause erroneous recognition of the parcel. That is, it is conceivable that color information at a position closer to the center position obtained when a distance image of predetermined parcel is projected onto a plane represents a feature correctly specifying the parcel than color information at an edge portion of the parcel. Therefore, by tracking the parcel using color information of a position close to the center position, it becomes less affected by a region outside the parcel, and the parcel can be tracked with higher accuracy. Here, processor 34 generates weighting information such that a weight applied to a value of a feature amount of a color image at a position close to the center position is increased.

In the example of FIG. 6B, center position C of a distance image projected on a plane is a center position of upper surface T of parcel P in particular. Processor 34 specifies center position C of a plane (an upper surface) from a distance image, and there are three of region W3, region W2, and region W1 concentrically from center position C. For each region, weighting information is generated such that a weight applied to a value of a feature amount of the color image is increased. That is, a size of a weight in each region is weight in region W3>weight W2 in region W2>weight in region W1.

In this manner, according to each region on the plane (the upper surface), weighting information is generated such that a weight applied to a value of a feature amount of color information at a position close to the center position is increased. In other words, by weighting the value of the feature amount of the color image based on each region of a distance image (projected on the plane) of parcel, the weighting of the color information capable of correctly identifying the parcel becomes large. Based on the value of the feature amount of the weighted color image, the parcel is identified with high accuracy, and the parcel can be tracked with high accuracy.

When this control is expressed by an equation representing an evaluation value (Cost) of the determination area, the following equation (1) is obtained.

$$Cost = Cp \times Lp \qquad (1)$$

Here, Cost is an evaluation value of pixel p in a determination area. As a total value in the determination area of this value increases, a color of parcel is evaluated to be similar to a color of a region associated with the determination area. Pixel p may correspond to a set of pixels on an actual image, or may correspond to each pixel on the actual image. That is, Cost may be calculated for each set of pixels, or may be calculated for each pixel. In the former case, the amount of calculation can be reduced, and in the latter case, precise evaluation can be performed. Cp is a value indicating how close a pixel of a color image corresponding to pixel p of a determination area is to a center position of parcel, and corresponds to the weighting information described above. This value is obtained by a Gaussian distribution as an example. Lp is a value indicating a similarity between a pixel of a color image associated with pixel p in a determination area and a pixel to be evaluated, and corresponds to a value of the feature amount described above. As an example, this value is obtained from a similarity of histograms in YCbCr space.

By using such an evaluation value (also referred to as a weighted feature amount), the closer to the center position of the plane (the upper surface) of the parcel, the higher the weighting for the feature amount of the color information, so that a possibility that the determination area follows the center position of the parcel increases. As a result, even if a plurality of parcels are erroneously recognized as one parcel, the determination area is set to a position close to the center position of the parcel originally tracked. Therefore, even though parcels are separated from each other, a possibility that the determination area is moved to another parcel can be reduced.

As described above, according to the present disclosure, by using weighting information useful for identifying parcel, it is possible to track the parcel with high accuracy. In the process flow of FIG. 5 described above, weighting information is generated and assigned at a timing of step S60, for example, but this is only an example. A timing and an order of attaching an ID to parcel or projecting a projection image are arbitrary, and it is possible to cope with erroneous recognition by generating and attaching weighting information.

In addition, as described above, the same erroneous recognition also occurs when worker M lifts parcel P5. By reflecting not only color information but also information on a height change in an evaluation value of Cost, it is possible to more accurately track the parcel.

In addition to a color, an evaluation value based on a change in a height is expressed by the following equation (2).

$$\text{Cost} = \beta \times Cp \times Lp + \alpha \times De(p) \tag{2}$$

β and α are values used to normalize each evaluation value, and De(p) indicates the amount of change in a pixel of a distance image corresponding to pixel p in a determination area. α is set to be larger as the amount of change in a height direction is smaller. In addition, in a case where the change in a height is extremely large, a possibility of the same pixel in same parcel is low, so a value of α may be set to 0.

Further, De(p) is specifically obtained by the following equation (3).

$$De(p) = |d_t(p) - d_{t-1}(p)| \tag{3}$$

Here, $d_t(p)$ indicates a distance at time t of a pixel of a distance image corresponding to pixel p in a determination area. Further, $d_{t-1}(p)$ indicates a distance at time t-1 of the pixel of the distance image corresponding to pixel p in the determination area. That is, De(p) is an absolute value of the amount of a change in the pixel of the distance image corresponding to pixel p in the determination area.

Thus, the greater the change in height (De(p)), the higher the color similarity (Cp×Lp) required to increase an evaluation value (Cost). In other words, processor 34 weights a value of a feature amount of a color image of parcel as the amount of change in the height direction is smaller. Therefore, it is possible to suppress erroneous recognition in a case where the parcel is lifted.

As described above, according to the present disclosure, by adding information on a height change to identity evaluation between parcels, it is possible to track the parcel with high accuracy.

For example, as described in the following equation (4), an evaluation value (Cost) may be calculated in consideration of a change in a height without weighting a color similarity.

$$\text{Cost} = \beta \times Lp + \alpha \times De(p) \tag{4}$$

In this case, it is possible to suppress erroneous recognition caused by lifting parcel.

As described above, since the surrounding environment changes little by little as the parcel moves, the color image changes even for the same parcel. Therefore, in a case where a region with a high degree of similarity is found, the color associated with the determination area is also updated to a color of the region. Specifically, color information of parcel being tracked is stored in memory 36, and based on a similarity of the color information stored in memory 36 and color information obtained from a color image, processor 34 determines whether or not parcel is the same as the recognized parcel. In a case where it is determined that the parcel is the same as the recognized parcel, processor 34 updates the color information stored in memory 36 to the color information obtained from the color image.

Although the embodiment of a projection instruction device, a parcel sorting system, and a projection instruction method according to the present disclosure is described with reference to the drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure.

In the embodiment described above, it is described that the weight is increased, but this is only one expression. That is, the process of increasing the degree of influence on a result of determining whether or not parcels are the same is merely expressed as "increasing a weight", and is not limited to the process of increasing one calculation result. For example, when reversing signs of each equation described above, as the calculation result is decreased, a probability that it is determined that parcels are the same is increased. This is also included in the process of "increasing a weight" described in the embodiment described above.

INDUSTRIAL APPLICABILITY

The present disclosure is useful to provide a projection instruction device, a parcel sorting system, and a projection instruction method capable of preventing tracking accuracy of parcels from deteriorating even when parcels are adjacent or overlapped with each other.

REFERENCE MARKS IN THE DRAWINGS

10 LABEL READER
20 IMAGE SENSOR
22 DISTANCE IMAGE SENSOR
24 COLOR IMAGE SENSOR
30 PROJECTION INSTRUCTION DEVICE
32 INPUT UNIT
34 PROCESSOR
36 MEMORY
38 OUTPUT UNIT

40 PROJECTOR
50 TRANSPORT CONVEYOR
60 IMAGING PROJECTION DEVICE
100 PARCEL SORTING SYSTEM
P PARCEL

The invention claimed is:

1. A projection instruction device that generates a projection image to be projected on a parcel based on sensing information of the parcel, the sensing information including a color image of the parcel, the device comprising:
 a processor; and
 a memory, wherein
 the memory stores color information on the parcel being tracked,
 wherein by cooperating with the memory,
 the processor:
  determines whether or not the parcel is the same as a recognized parcel, based on a similarity of the color information stored in the memory and color information obtained from the color image,
  updates the color information stored in the memory to the color information obtained from the color image in a case where it is determined that the parcel is the same as the recognized parcel,
  performs a weighting on a value of a feature amount of the color image in each of a plurality of regions on a plane of the parcel, wherein the feature amount is the similarity of the color information and the plurality of regions is disposed in a concentric manner from a center position of the plane, and
  tracks the parcel based on the weighted value of the feature amount of the color image performed in each of the plurality of regions.

2. The projection instruction device of claim 1, wherein the center position is a center position on an upper surface of the parcel.

3. A parcel sorting system comprising:
 the projection instruction device of claim 1;
 a label reader that reads parcel identification information from a label attached to the parcel;
 an image sensor that obtains the color image; and
 an image projection device that projects the projection image on the parcel.

4. A projection instruction device that generates a projection image to be projected on a parcel based on sensing information of the parcel, the sensing information including a color image of the parcel and a distance image of the parcel, the device comprising:
 a processor; and
 a memory,
 wherein by cooperating with the memory,
 the processor:
  performs a weighting on a value of a feature amount of the color image based on the distance image;
  specifies a change amount of the parcel in a height direction based on the distance image such that the smaller the change amount of the parcel is the larger the weighting is to the feature amount of the color image; and
  tracks the parcel based on the weighted value of the feature amount of the color image.

5. A parcel sorting system comprising:
 the projection instruction device of claim 4;
 a label reader that reads parcel identification information from a label attached to the parcel;
 an image sensor that obtains the distance image and the color image; and
 an image projection device that projects the projection image on the parcel.

6. The projection instruction device according to claim 4, wherein
 the processor tracks the parcel based on the weighted value of the feature amount of the color image performed in each of a plurality of regions on the plane of the parcel, the plurality of regions being disposed in a concentric manner from a center position of the plane.

7. The projection instruction device of claim 6, wherein the center position is a center position on an upper surface of the parcel.

8. A projection instruction method of generating a projection image to be projected on a parcel based on sensing information of the parcel, the sensing information including a color image of the parcel, the method comprising:
 by causing a processor to cooperate with a memory, performing:
  determining whether or not the parcel is the same as a recognized parcel, based on a similarity of color information stored in the memory and color information obtained from the color image;
  updating the color information stored in the memory to the color information obtained from the color image in a case where it is determined that the parcel is the same as the recognized parcel;
  performing a weighting on a value of a feature amount of the color image in each of a plurality of regions on a plane of the parcel, wherein the feature amount is the similarity of the color information and the plurality of regions is disposed in a concentric manner from a center position of the plane; and
  tracking the parcel based on the weighted value of the feature amount of the color image performed in each of the plurality of regions.

9. A projection instruction method of generating a projection image to be projected on a parcel based on sensing information of the parcel, the sensing information including a color image of the parcel and a distance image of the parcel, the method comprising:
 by causing a processor to cooperate with a memory, performing:
  performing a weighting on a value of a feature amount of the color image based on the distance image;
  specifying a change amount of the parcel in a height direction based on the distance image such that the smaller the change amount of the parcel is the larger the weighting is to the feature amount of the color image; and
  tracking the parcel based on the weighted value of the feature amount of the color image.

* * * * *